W. REANEY.
Plow.
No. 21,846.
Patented Oct. 19, 1858.
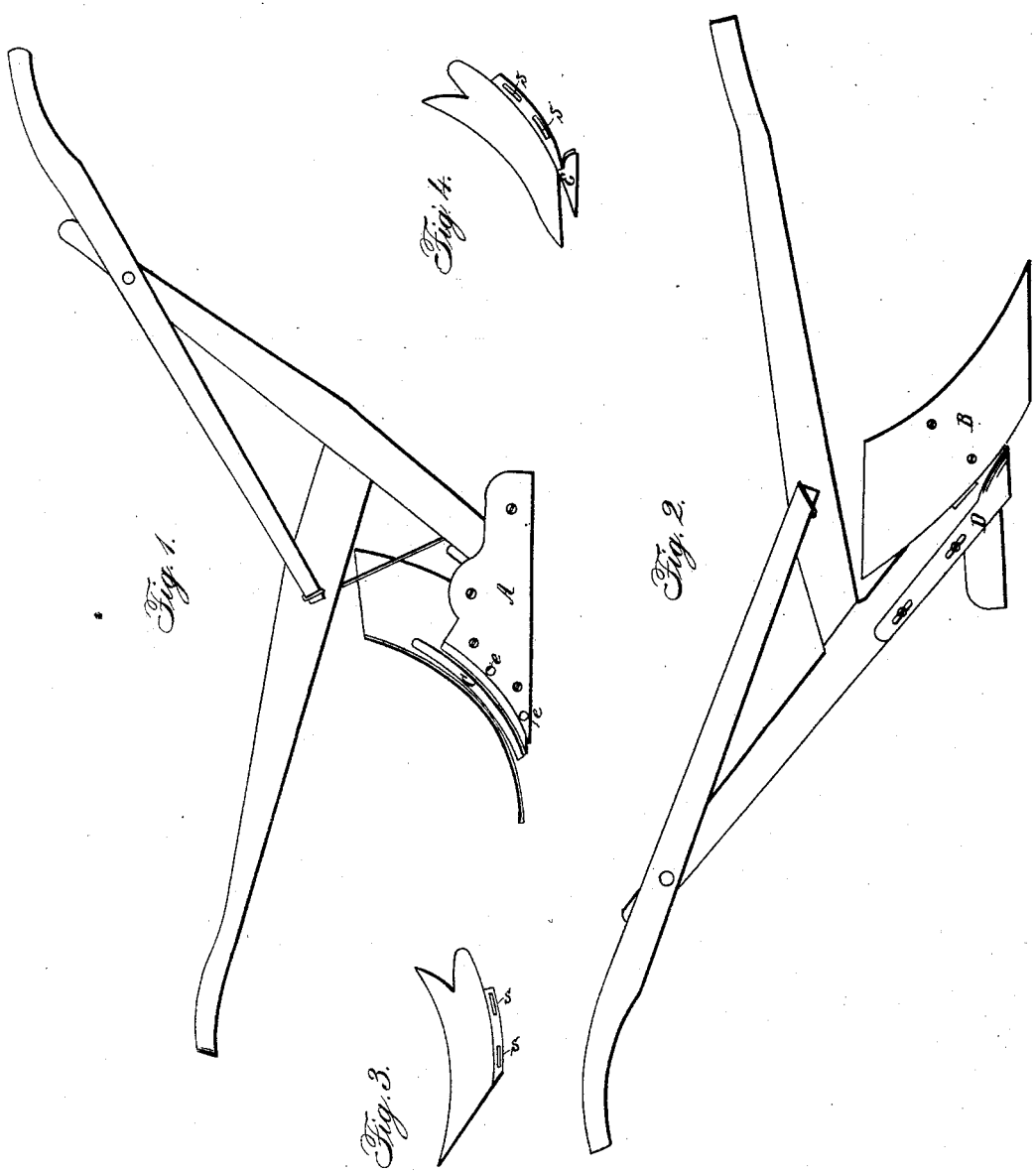

UNITED STATES PATENT OFFICE.

WILLIAM REANEY, OF BERZELIA, GEORGIA.

IMPROVEMENT IN PLOWS.

Specification forming part of Letters Patent No. 21,846, dated October 19, 1858.

*To all whom it may concern:*

Be it known that I, WILLIAM REANEY, of Berzelia, in the county of Columbia and State of Georgia, have invented a new and Improved Plow; and I do hereby declare that the following is a full and exact description thereof, reference being had to the accompanying drawings, and to the letters of reference marked thereon.

In the accompanying drawings, Figure 1 is a view of the landside of my plow with the colter removed to show the mode of adjusting the mold-board. Fig. 2 is a view of the opposite side, (the colter being removed,) showing the rear subsoiler. Fig. 3 shows the colter detached. Fig. 4 is a view of the subsoil-colter.

My invention consists in an improved mode of changing the form of a plow so as to adapt it to different soils, and to shallow or to subsoil plowing at pleasure.

My plow-stock is very simple, and may be of any usual form, as seen in Figs. 1 and 2, and the landside A may be of cast-iron or of wood covered with an iron plate. I employ at pleasure either of the two colters, Figs. 3 and 4, according to the character of the soil. These colters have slots $s$, by which they are adjustable upon screw-bolts fitting into holes $e$. One of these colters, Fig. 4, has a subsoiler, E, projecting below the landside A, Fig. 1.

My mold-board B is reversible, so that either end may be placed foremost. It is also adjustable by means of a wedge, C, which may be inserted, as seen in Fig. 1, or removed at pleasure. By the insertion simply of this wedge C and the adjustment of the colter downward and forward the shape of my plow is entirely changed, forming a long, sharp plow, well adapted to stiff, hard soil, or to subsoiling. By removing the wedge and elevating the colter we have a shorter plow, suited to lighter soils.

The wedge C may be inserted more or less, so as to graduate the adjustment of the mold-board to correspond with that of the colter.

In addition to the subsoiler E seen in Fig. 4 I have another, shown at D, Fig. 2. This is also adjustable, and may be used either alone or in connection with the subsoiler seen at Fig. 1. On account of these two subsoilers and the adjustable colter and mold-board my plow can assume many forms, which enable it to meet various demands in cultivation, and give it a great advantage over other plows. At the same time the construction of my plow is very simple and cheap, yet strong and durable.

I am aware that movable mold-boards are not new. Therefore I do not claim, broadly, the mere adjustment of the mold-board or other parts of the plow in order to change the form of the latter; but I limit my claim to the above-described plow, the parts being made adjustable in the manner set forth.

Having thus fully described my invention, what I claim, and desire to secure by Letters Patent of the United States, is—

1. The mode of varying the form of the plow by the use of the adjustable colters, Figs. 3 and 4, the latter being provided with the subsoiler E, and the several parts constructed and arranged for operation substantially as set forth.

2. The use of the wedge C, in combination with the mold-board, for adjusting the entire front part of the mold-board to correspond with the adjustment of the colters, as described.

WILLIAM REANEY.

Attest:
GEORGIA JACKSON,
SAML. M. JACKSON.